(12) United States Patent
Segatta et al.

(10) Patent No.: US 6,776,206 B1
(45) Date of Patent: Aug. 17, 2004

(54) TIRE WITH APEX RUBBER BLEND AND METHOD OF MAKING SAME

(75) Inventors: Thomas Joseph Segatta, Lawton, OK (US); Paul Harry Sandstrom, Tallmadge, OH (US); Shahir Rafael Azer, Norton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 08/353,942

(22) Filed: Dec. 12, 1994

Related U.S. Application Data

(63) Continuation of application No. 07/945,465, filed on Sep. 16, 1992, now abandoned.

(51) Int. Cl.[7] .............................. B60C 1/00; B60C 15/06
(52) U.S. Cl. .................... 152/541; 152/547; 156/110.1; 156/135; 525/236
(58) Field of Search ............................... 152/541, 547, 152/564, 537, 515; 156/135, 110.1, 113, 307; 525/236

(56) References Cited

U.S. PATENT DOCUMENTS

| | | | |
|---|---|---|---|
| 3,244,773 A | * | 4/1966 | Craich .......................... 525/236 |
| 4,089,360 A | * | 5/1978 | Bohm .......................... 156/123 |
| 4,510,191 A | | 4/1985 | Kagami et al. .............. 525/237 |
| 4,635,693 A | | 1/1987 | Ahagon et al. .......... 152/209 R |
| 4,824,899 A | * | 4/1989 | Yasuda ........................ 132/541 |
| 5,017,636 A | * | 5/1991 | Hattori et al. ............... 524/300 |
| 5,174,838 A | * | 12/1992 | Sandstrom et al. .......... 156/123 |
| 5,229,459 A | * | 7/1993 | Sandstrom et al. .......... 525/136 |
| 5,284,195 A | * | 2/1994 | Sandstrom et al. ..... 152/209 R |
| 5,386,865 A | * | 2/1995 | Sandstrom et al. .......... 152/525 |

FOREIGN PATENT DOCUMENTS

| | | | | |
|---|---|---|---|---|
| EP | 410311 | * | 1/1991 | .................. 152/525 |
| EP | 461329 | * | 12/1991 | .................. 152/525 |
| JP | 57-213239 | * | 12/1982 | .................. 152/541 |
| JP | 2408501983 | | 12/1983 | |
| JP | 2412971985 | | 10/1985 | |
| JP | 1-135847 | * | 5/1989 | .................. 152/525 |

OTHER PUBLICATIONS

Abstract 85–287198, Database WPI, Week 8546, Derwent Publications Ltd, London, GB & JP–A–60 197 749, Oct. 1985.

Patent Abstracts of Japan, vol. 6, No. 94 (C–105)(972)Jun. 2, 1982 and JP–A–57 025 340, Feb. 10, 1982.

* cited by examiner

*Primary Examiner*—Adrienne C. Johnstone
(74) *Attorney, Agent, or Firm*—John D. DeLong; Bruce J. Hendricks

(57) ABSTRACT

A radial tire having the apex area around the steel reinforced carcass ply turn-up comprised of at least one selected diene rubber and a trans 1,4-polybutadiene rubber.

12 Claims, 1 Drawing Sheet

TIRE WITH APEX RUBBER BLEND AND METHOD OF MAKING SAME

This application is a continuation of Ser. No. 07/945,463, filed on Sep. 16, 1992 now abandoned.

FIELD

This invention relates to a pneumatic tire having an apex in the region of the steel cord reinforced carcass ply turn-up. More specifically, the invention relates to such a tire having an apex comprised of a diene rubber and a trans 1,4-polybutadiene resin.

BACKGROUND

The term "apex" as used herein refers to the area of the tire in the immediate proximity of the carcass ply turn-up. The apex includes a rubber wedge located in the lower sidewall region above the bead and is bonded to and encased by the carcass plies. The apex also includes the area located between the lower sidewall rubber and the axially outer side of the carcass ply turn-up.

A tire is a composite of several components each serving a specific and unique function yet all synergistically functioning to produce the desired performance. One important component is the carcass ply. The carcass ply is a continuous layer of rubber-coated parallel cords which extends from bead to bead and functions as a reinforcing element of the tire. The ply is turned-up around the bead, thereby locking the bead into the assembly or carcass. The tire is assembled in the green (uncured) state and upon completion is then vulcanized. Unfortunately, prior to vulcanization when steel cord is the reinforcement in the carcass ply, the carcass ply turn-up can cause deformation of the components which upon vulcanization results in an unacceptable product. The deformation of the steel cord reinforced carcass ply turn-up in the area of the apex is known as "apex creep". Apex creep is a distortion of the apex compound at the steel cord reinforced carcass ply turn-up endings without an interfacial separation due to the stresses associated with the steel cord reinforcement in the carcass ply. Conventionally, natural rubber is used as the rubber in the apex area along with additional reinforcement provided by nylon or Flexten® chippers.

The use of trans 1,4-polybutadiene has been disclosed for various purposes, including, for example, tire tread rubber compounds and increasing green strength of rubber mixtures (see Japanese Patent Publication Nos. 60-133,036; 62-101,504 and 61-143,453) and U.S. Pat. No. 4,510,291.

Uniquely, trans 1,4-polybutadiene is typically a thermoplastic resin rather than rubber in its uncured state at room temperature by virtue of its high crystallinity. Because it contains many double bonds in its backbone, it can, however, be suitably blended and co-cured with elastomers.

BRIEF DESCRIPTION OF THE DRAWING

The invention will be described by way of example and with reference to the accompanying drawing in which.

DETAILED DISCLOSURE OF THE INVENTION

Figure 1:
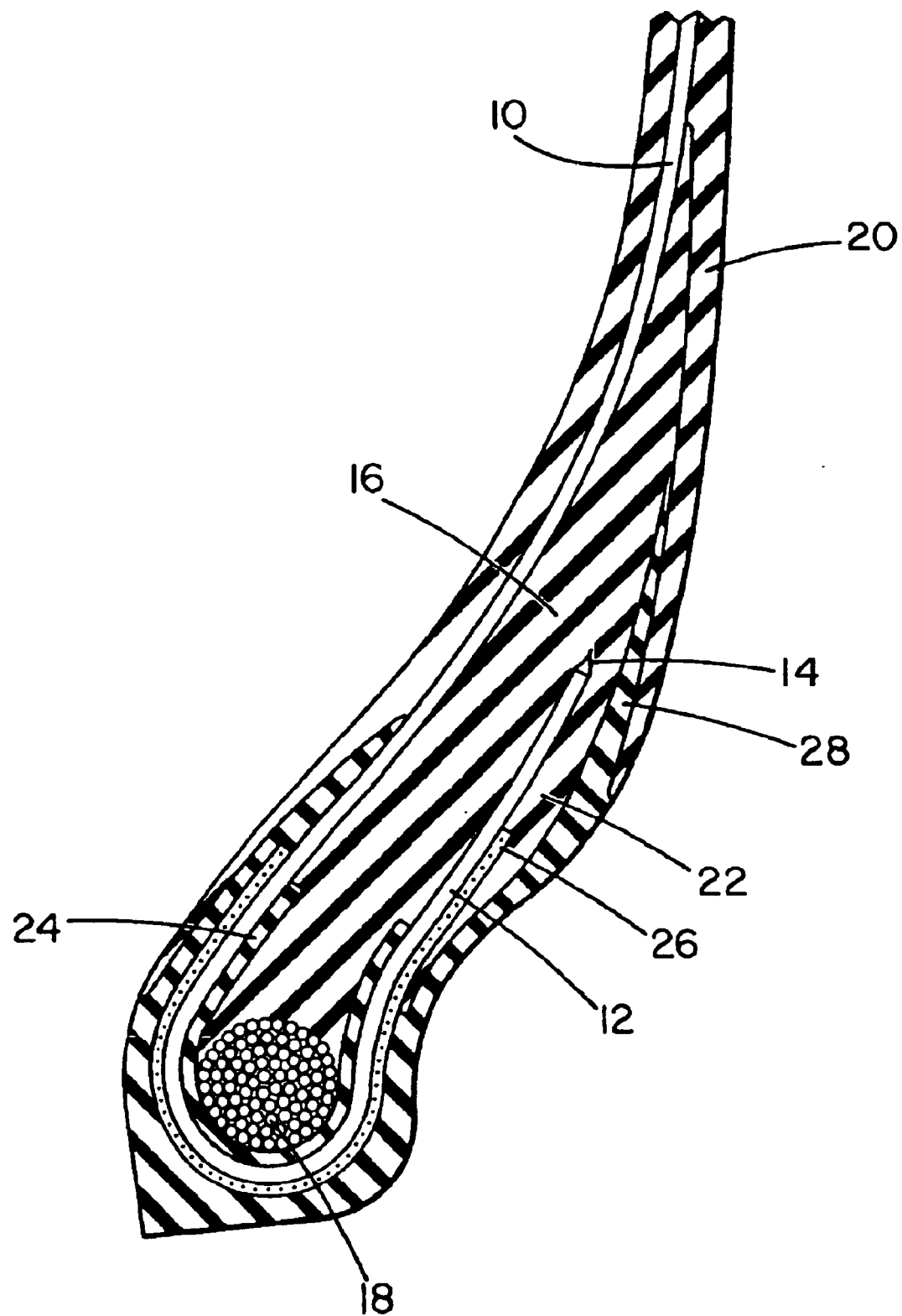
FIG. 1 is a partial cross-sectional view of a tire according to the present invention.

The present invention relates to a pneumatic tire. Pneumatic tire means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid that sustains the vehicle load. In particular, the present invention relates to a radial-ply tire. Radial-ply tire means a belted or circumferentially-restricted pneumatic tire in which the carcass ply cords which extend from bead to bead are laid at cord angles between 65° and 90° with respect to the equatorial plane of the tire.

A presently preferred embodiment of this invention is shown in FIG. 1. The pneumatic tire contains a single steel cord reinforced carcass ply 10 with a turn-up portion 12 and a terminal end 14. Steel cord means one or more of the reinforcement elements, formed by one or more steel filaments/wires which may or may not be twisted or otherwise formed which may further include strands so formed which strands may or may not be also so formed, of which the carcass ply in the tire is comprised. The apex 16 is in the immediate proximity of the carcass ply turn-up 14 including the area above the bead 18 and is encased by the carcass ply 10 and carcass ply turn-up 12 or sidewall compound 20. The apex also includes the area 22 located between the lower sidewall 20 and the axially outer side of the carcass ply turn-up 12. The interface between the bead 18 and the carcass ply 10 is a flipper 24. Located outside of the carcass ply 10 and extending in an essentially parallel relationship to the carcass ply 10 is the chipper 26. Located around the outside of the bead 18 is the chafer 28 to protect the carcass ply 12 from the rim (not shown), distribute flexing above the rim, and seal the tire.

In accordance with this invention, a rubber tire is provided having an apex 16, 22 in the region of the steel cord reinforced carcass ply turn-up 12 wherein said rubber in said apex 16, 22 is a sulfur cured rubber composition comprised of, based on 100 parts by weight rubber (phr), (A) about 80 to about 97, preferably about 90 to about 95 parts by weight of at least one rubber selected from the group consisting of natural rubber, synthetic cis 1,4-polyisoprene rubber, and cis 1,4-polybutadiene rubber; and (B) about 3 to about 20, preferably about 5 to about 10 parts by weight of trans 1,4-polybutadiene characterized by having at,least about 65 percent trans 1,4-content.

The present invention also relates to a method of preparing a pneumatic rubber tire having a steel cord reinforced carcass ply and an apex which comprises shaping and curing an uncured pneumatic rubber tire in a mold by pressing said tire outwardly against a mold surface under conditions of heat and pressure to cause at least the tread rubber of said tire to flow and cure against said mold surface, the improvement comprising the use of a rubber composition in the apex comprised of, based on 100 parts by weight rubber, (A) about 80 to about 97 parts by weight of at least one diene rubber selected from the group consisting of natural rubber, synthetic cis 1,4-polyisoprene rubber, cis 1,4-polybutadiene rubber; and (B) about 3 to about 20 parts by weight of a trans 1,4-polybutadiene rubber having at least 65 percent trans 1,4-content.

Thus, in the practice of this invention, the trans 1,4-polybutadiene polymer is considered as acting as reinforcement before vulcanization and restricts flow of the carcass ply into the sidewall rubber during processing and storage prior to curing of the tire, however, during curing the trans 1,4-polybutadiene plastic melts and blends into the polymer matrix, transforms into a rubbery polymer upon curing resulting in a highly resilient cured polymer blend.

Generally speaking, the trans 1,4-polybutadiene can be characterized by having the weight percent of 1,4-bonds ranging from about 65 to about 90 percent, about 5 to 20 weight percent of its units of a vinyl 1,2-structure and 2 to 15 weight percent of its units of a cis 1,4-structure. Preferably, such trans 1,4-polybutadiene is characterized by having about 75 to about an 85 percent of its butadiene repeat units of a trans 1,4-isomeric structure, about 12 to about 18 percent of its units of a 1,2-structure and about 3 to about 8 percent of its units of a cis 1,4-structure and, in its uncured state, a first major melting point in the range of about 35° C. to about 45° C. and a second minor melting point in the range of about 55° C. to about 65° C. Preferably, the first and second melting points are separated by at least 15° C. and a 20° C. difference is particularly preferred.

Thus, a further aspect of this invention is directed to a method of preparing a pneumatic rubber tire with an apex 16, 22 in the region of the steel cord reinforced carcass ply turn-up 12 which comprises shaping and curing an uncured pneumatic rubber tire in a mold by pressing said tire outwardly against a mold surface under conditions of heat and pressure to vulcanize the tire, the improvement which comprises providing for said tire the apex compound of this invention.

The relative low melting points of the required trans 1,4-polybutadiene are particularly an advantage because they do not present an appreciable processing difficulty because they are substantially below typical rubber processing temperatures, whereas, other potential methods which might be considered for reducing apex creep involve using larger amounts of filler or higher softening point resins would present processing difficulties.

The trans 1,4-polybutadiene utilized by this invention can be prepared by anionic polymerization by batch polymerizing 1,3-butadiene in an organic solvent and in the presence of cobalt octoate and triethyl aluminum as a catalyst system with a para alkyl substituted phenol as a catalyst modifier.

Trans-1,4-polybutadiene is normally prepared utilizing transition metal catalysts or rare earth catalysts. The synthesis of trans-1,4-polybutadiene with transition metal catalysts is described by J. Boor, Jr., "Ziegler-Natta Catalysts and Polymerizations", Academic Press, New York, 1979, Chapters 5–6. The synthesis of trans-1,4-polybutadiene with rare earth metal catalysts is described by D. K. Jenkins, Polymer, 26, 144 (1985).

In addition to the trans-1,4-polybutadiene, the apex rubber composition may be comprised of at least one rubber selected from the group consisting of natural rubber, synthetic cis 1,4-polyisoprene rubber and cis 1,4-polybutadiene rubber. Preferably, natural rubber is used.

It is readily understood by those having skill in the art that the rubber compositions used in the apex area would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical additions of carbon black comprise about 20 to 200 parts by weight of diene rubber (phr), preferably 30 to 60 phr. Typical amounts of tackifier resins, if used, comprise 1 to 20 phr. Such processing aids can include, for example, aromatic, napthenic, and/or paraffinic processing oils. Silica, if used, may be used in an amount of about 5 to about 25 phr, often with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine, polymerized 1,2-dihydro-2,2,4-trimethylquinoline and others, such as, for example, those disclosed in the *Vanderbilt Rubber Handbook* (1990), pages 343–362. Typical amounts of antiozonants comprise about 1 to about 5 phr. Representative antiozonants may be, for example, those disclosed in the *Vanderbilt Rubber Handbook* (1990), pages 363–367. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of specified blends of rubbers in apex compound, particularly as to the inclusion of the trans polybutadiene in the apex compound as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which is generally used in the larger amount (0.5 to 1.0 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the utilization of specified blends of rubbers in the apex area, particularly the inclusion of the trans polybutadiene in the apex rubber.

The tire can be built, shaped, molded and cured by various methods which will be readily apparent to those having skill in such art.

The prepared tire of this invention is conventionally shaped and cured by methods known to those having skill in such art.

The invention may be better understood by reference to the following examples in which the parts and percentages are by weight unless otherwise indicated.

EXAMPLE 1

Mixtures of diene rubbers with and without trans 1,4-polybutadiene having two softening points of about 40° C. and 60° C. were prepared comprised of the following recipe shown in Table I as Compounds A–F. Experiment A is considered a Control.

TABLE I

|  | Control A | B | C | D | E | F |
|---|---|---|---|---|---|---|
| Natural Rubber | 40 | 40 | 40 | 40 | 40 | 40 |
| High Cis Polybutadiene[1] | 60 | 55 | 54 | 53 | 50 | 45 |
| High Trans Polybutadiene | 0 | 5 | 6 | 7 | 10 | 15 |

[1]Commercially available from The Goodyear Tire & Rubber Company under the designation Budene ® 1207.

Conventional amounts of carbon black, oil, antidegradant(s) (para-phenylene diamine type), tackifying resin, fatty acid, zinc oxide, peptizer, sulfur and accelerator of the sulfenamide type were used to prepare each sample.

The trans 1,4-polybutadiene for this example was characterized by having a trans 1,4-content of about 80 percent, a cis 1,4-content of about 5 percent and a vinyl 1,2-content of about 15 percent. It was further characterized by having a number average molecular weight (Mn) of about 205,000 and a weight average molecular weight (Mw) of about 430,000. It was additionally characterized by having a Tg of about –75° C. and melting points (Tm) of 40° C. (major) and 60° C. (minor). (Both the Tg and Tm were determined by differential scanning calorimeter at 10° C. per minute).

Such trans 1,4-polybutadiene can be suitably prepared by batch polymerizing 1,3-butadiene in an aliphatic hydrocarbon solution (e.g. hexane) in the presence of a catalyst of cobalt octoate and triethylaluminum with p-dodecylphenol modifier, although it can also be prepared by continuous polymerization with a suitable gel inhibitor.

The prepared rubber compositions were cured at a temperature of about 150° C. for about 20 minutes and the resulting cured rubber samples evaluated for their physical properties as shown in the following Table II.

TABLE II

| Sample | Control A[1] | B[2] | C[2] | D[2] | E[2] | F |
|---|---|---|---|---|---|---|
| Natural Rubber | 40 | 40 | 40 | 40 | 30 | 40 |
| Polybutadiene | 60 | 55 | 54 | 53 | 60 | 45 |
| Trans Polybutadiene | 0 | 5 | 6 | 7 | 10 | 15 |
| Cure Rheology |  |  |  |  |  |  |
| T1 (min.) | 4.6 | 4.6 | 4.4 | 4.8 | 5.0 | 5.0 |
| T25 (min.) | 8.0 | 8.0 | 7.9 | 8.3 | 8.9 | 8.7 |
| T90 (min.) | 22.7 | 23.7 | 23.2 | 24.3 | 26.1 | 26.4 |
| Stress-Strain |  |  |  |  |  |  |
| 300% Modulus (MPa) | 6.51 | 6.28 | 6.42 | 6.14 | 6.10 | 6.03 |
| Break Strength (MPa) | 14.89 | 14.67 | 15.52 | 15.11 | 13.38 | 13.99 |
| Elongation at Break (%) | 612 | 616 | 638 | 650 | 596 | 627 |
| Hysteresis |  |  |  |  |  |  |
| Rebound (RT) | 58.3 | 57.6 | 57.8 | 58.1 | 58.8 | 58.8 |
| Rebound (100° C.) | 65.1 | 65.2 | 64.6 | 65.1 | 65.2 | 64.4 |
| Gr n Strength |  |  |  |  |  |  |
| Tensile (MPa) | .769 | .827 | .831 | .906 | 1.04 | 1.51 |
| % Elongation | 504 | 675 | 680 | 600 | 308 | 245 |
| @ 100% (MPa) | .533 | .468 | .440 | .526 | .760 | .930 |
| @ 200% (MPa) | .749 | .663 | .632 | .814 | 1.27 | 1.57 |
| @ 300% (MPa) | .787 | .839 | .942 | — | 1.01 | — |
| @ 400% (MPa) | .659 | .778 | .763 | .845 | — | — |

[1]Average of 3 samples.
[2]Average of 2 samples.

As Table II indicates, the basic stress-strain and hysteresis properties of the compounds using trans-1,4-polybutadiene are essentially the same as the control while the green strength is significantly improved, starting with 5 parts and especially at levels above 6 parts.

EXAMPLE 2

Mixtures of natural rubber and trans 1,4-polybutadiene having two softening points of about 40° C. and about 60° C. were prepared comprised of the recipe of Table III as Samples A and B. Sample A is considered a control and Sample B represents a composition for use in the present invention.

TABLE III

|  | Parts | |
|---|---|---|
|  | Sample A Control | Sample B |
| Natural Rubber | 100 | 95 |
| Trans 1,4-Polybutadiene[1] | 0 | 5 |

Conventional amounts of carbon black, antioxidants (hydroquinoline type and para-phenylene diamine type), silica, tackifying resin, fatty acid, zinc oxide, sulfur and accelerator of the disulfide type were used.

(1) A trans 1,4-polybutadiene for this invention characterized by high trans 1,4-polybutadiene content (80 percent trans 1,4-).

The prepared rubber compositions of Example 3 were cured at a temperature of about 150° C. for about 20 minutes and the resulting cured rubber samples evaluated for their physical properties as shown in the following Table IV.

TABLE IV

|  | Control Sample A | Sample B |
|---|---|---|
| Stress-Strain |  |  |
| 300% Modulus (MPa) | 8.43 | 8.51 |
| Tensile Strength (MPa) | 18.70 | 17.96 |
| Elongation (%) | 578 | 551 |

TABLE IV-continued

|  | Control Sample A | Sample B |
| --- | --- | --- |
| Hardness (Room Temperature) | 54.9 | 54.1 |
| Rebound[1] | | |
| Room Temperature (%) | 56.8 | 57.6 |
| 100° C. (%) | 69.2 | 69.0 |
| Green Strength[2] (MPa) | | |
| Tensile | 2.14 | 2.41 |
| % Elongation | 540 | 583 |
| 50% Elongation | .469 | .517 |
| 100% Elongation | .576 | .616 |
| 200% Elongation | .797 | .892 |
| 300% Elongation | 1.09 | 1.21 |
| 400% Elongation | 1.52 | 1.65 |
| 500% Elongation | 1.94 | 2.09 |

[1] The rebound value is determined by pendulum rebound test, a type of method well known to those having skill in rubber property determination.
[2] Measure of stress of the uncured rubber compound.

Observation of the physical properties of the rubber composite demonstrate that the green strength of Sample B increased while maintaining equal stress/strain and resilience (rebound value) properties.

While certain representative embodiments and details have been shown for the purpose of illustrating the subject invention, it will be apparent to those skilled in this art that various changes and modifications can be made therein without departing from the scope of the subject invention.

What is claimed is:

1. A radial tire comprising a steel cord reinforced carcass ply and an apex of a composition comprised of, based on 100 parts by weight rubber, (A) about 80 to about 97 parts by weight of at least one diene rubber selected from the group consisting of natural rubber, synthetic cis 1,4-polyisoprene rubber and cis 1,4-polybutadiene rubber; and (B) about 3 to about 20 parts by weight of a trans 1,4-polybutadiene rubber having about 75 to about 85 percent by weight trans 1,4-content, about 12 to about 18 percent by weight of vinyl 1,2-content and about 3 to about 8 percent by weight cis 1,4-content and, in its uncured state, a first major melting point in the range of about 35° C. to about 45° C. and a second minor melting point in the range of about 55° C. to about 65° C.

2. The tire of claim 1 wherein said apex composition is comprised of, based on 100 parts by weight rubber, (A) about 90 to about 95 parts by weight of at least one of said diene rubbers, and (B) about 5 to about 10 parts by weight of said trans 1,4-polybutadiene rubber.

3. The tire of claim 1 wherein said at least one diene rubber is natural rubber.

4. The tire of claim 1 wherein said trans 1,4-polybutadiene has a trans 1,4-content of about 80 percent by weight, a cis 1,4-content of about 5 percent by weight and a vinyl 1,2-content of about 15 percent by weight.

5. The tire of claim 1 wherein said trans 1,4-polybutadiene has a number average molecular weight (Mn) of about 205,000.

6. The tire of claim 1 wherein said trans 1,4-polybutadiene has a weight average molecular weight (Mw) of about 403,000.

7. A method of preparing a pneumatic rubber tire having a steel cord reinforced carcass ply and an apex which comprises shaping and curing an uncured pneumatic rubber tire in a mold by pressing said tire outwardly against a mold surface under conditions of heat and pressure to cause at least the tread rubber of said tire to flow and cure against said mold surface, the improvement comprising the use of a rubber composition in the apex comprised of, based on 100 parts by weight rubber, (A) about 80 to about 97 parts by weight of at least one diene rubber selected from the group consisting of natural rubber, synthetic cis 1,4-polyisoprene rubber and cis 1,4-polybutadiene rubber; and (B) about 3 to about 20 parts by weight of a trans 1,4-polybutadiene rubber having about 75 to about 85 percent by weight trans 1,4-content, about 12 to about 18 percent by weight of vinyl 1,2-content and about 3 to about 8 percent by weight cis 1,4-content and, in its uncured state, a first major melting point in the range of about 35° C. to about 45° C. and a second minor melting point in the range of about 55° C. to about 65° C.

8. The method of claim 7 wherein said apex rubber composition is comprised of, based on 100 parts by weight rubber, (A) about 90 to about 95 parts by weight of at least one of said diene rubbers, and (B) about 5 to about 10 parts by weight of said trans 1,4-polybutadiene rubber.

9. The method of claim 7 wherein said at least one diene rubber is natural rubber.

10. The method of claim 7 wherein said trans 1,4-polybutadiene has a trans 1,4-content of about 80 percent by weight, a cis 1,4-content of about 5 percent by weight and a vinyl 1,2-content of about 15 percent by weight.

11. The method of claim 7 wherein said trans 1,4-polybutadiene has a number average molecular weight (Mn) of about 205,000.

12. The method of claim 7 wherein said trans 1,4-polybutadiene has a weight average molecular weight (Mw) of about 403,000.

* * * * *